United States Patent [19]
Olson et al.

[11] Patent Number: 5,146,838
[45] Date of Patent: Sep. 15, 1992

[54] PISTON APPARATUS FOR USE IN WEB PRESSING COMPONENTS IN PAPERMAKING MACHINERY

[75] Inventors: Keith R. Olson, Beloit, Wis.; Charles C. Moschel, Stephens City, Va.

[73] Assignee: Beloit Corporation, Beloit, Wis.

[21] Appl. No.: 818,577

[22] Filed: Jan. 9, 1992

[51] Int. Cl.$^5$ .................................................. F16J 1/00
[52] U.S. Cl. ........................................ 92/177; 92/182; 29/116.2; 277/220
[58] Field of Search ................ 92/177, 182, 185; 29/116.2; 277/217, 220, 221

[56] References Cited

U.S. PATENT DOCUMENTS

| | | | |
|---|---|---|---|
| 2,884,290 | 4/1959 | Morrow | 92/177 |
| 3,494,675 | 2/1970 | Hold et al. | |
| 3,624,880 | 12/1971 | Justus et al. | 29/116.2 |
| 4,064,607 | 12/1977 | Wolf | 29/116.2 |
| 4,404,724 | 9/1983 | Christ et al. | 29/116.2 |
| 4,858,292 | 8/1989 | Buhlmann et al. | 29/116.2 |

FOREIGN PATENT DOCUMENTS

| | | | |
|---|---|---|---|
| 1102636 | 10/1955 | France | 92/177 |
| 0697774 | 11/1979 | U.S.S.R. | 277/217 |

*Primary Examiner*—Thomas E. Denion
*Attorney, Agent, or Firm*—Dirk J. Veneman; Raymond W. Campbell; Gerald A. Mathews

[57] ABSTRACT

A piston apparatus for use in a controlled deflection roll includes a rectilinear-shaped piston having at least one side seal extending longitudinally in a slot in each side wall and an end seal in each end of the piston extending between the side seals. The end seals have at least one pair of intersecting surfaces at each end thereof which cooperate with a corresponding pair of surfaces of each side seal to move longitudinally relative to the piston and side seals to maintain a continuous seal peripherally about the piston. The continuous seal engages the side walls of a channel within the support shaft of the controlled deflection roll and a non-movable seal surface in each of two, opposed dams at either end of the channel in the support shaft. The side and end seals move with the piston relative to the support shaft and seal surfaces on the end dams.

9 Claims, 3 Drawing Sheets

PISTON APPARATUS FOR USE IN WEB PRESSING COMPONENTS IN PAPERMAKING MACHINERY

BACKGROUND OF THE INVENTION

1. Field of the Invention

This invention relates to a controlled deflection roll or an extended nip press, such as is used in the papermaking industry to process a traveling paper web. More particularly, this invention relates to the piston which is supported in a channel on a support shaft within a controlled deflection roll or extended nip press to bias a shoe outwardly relative to the shaft to engage and control the deflection of the roll shell rotating about the shaft. Still more particularly, this invention relates to a unique seal arrangement between the piston and the side walls of the channel and end dams at the ends of the channel.

2. Description of the Prior Art

In prior controlled deflection rolls, the piston, which actuates a shoe which contacts the inner surface of the rotating roll shell to control the deflection of the roll shell and to load the roll shell into nipping engagement with a mating roll, has a pair of continuous slots extending around the piston in which corresponding seals are disposed to engage the side walls of a channel in which the piston is disposed. At the ends of the piston, the seals contact a flat surface of an end plate which is vertically arrayed in an end dam mounted to the support shaft. The end plate is, in turn, biased toward the seal by hydraulic pressure which is introduced between the end plate and end dam. The end plate is movable relative to the end dam toward the piston and its seal. When the piston is hydraulically actuated to move radially outwardly relative to the support shaft, the same hydraulic fluid is also introduced into a space between the end plate and the end dam which restrains the end plate from movement in any direction except toward and away from the piston in a direction parallel with the longitudinally extending length of the piston in the channel in the support shaft.

The seals in the side slots in the piston are biased outwardly with springs. The end seals are fitted to the ends of the side seals so as to maintain sealing continuity around the ends of the piston. The fluid seal at the ends of the piston is effected, as explained above, by maintaining the end plates disposed in the end dams biased against the end seals by the same pressurized hydraulic fluid which is used to actuate the roll shell-supporting shoe, which is either supported by the piston or is an integral part of the piston. The piston is, thus, sealed about its entire periphery such that the hydraulic fluid which pressurizes and actuates the piston cannot escape around and past the piston to the space in the controlled deflection roll intermediate the rotating roll shell and the support shaft of the controlled deflection roll. The only hydraulic fluid lubricant which is purposely introduced into the space between the roll shell and support shaft is controlled in both quantity and location, such as by introducing the lubricant to the face of the shoe by so-called capillary or throttling tubes extending in the shoe and piston between the channel and pockets in the face of the shoe. This is known as hydrostatic lubrication. Another method of lubricating the interface of the shoe and inner surface of the roll shell is hydrodynamically, such as by introducing lubricant against the inner surface of the roll shell immediately upstream of its contact with the leading edge of the shoe, to provide a hydrodynamic fluid film of lubrication. Both methods are used in contemporary controlled deflection rolls and are contemplated for use in the controlled deflection roll utilizing the seal of this invention, although the method of providing such lubrication does not form part of the invention.

The problem with the prior art seal construction described above is that the position of the end seal against the end plate changes as the piston is actuated relative to the stationary support shaft. This is particularly true in so-called self-loading types of controlled deflection rolls wherein the piston and shoe move a relatively greater distance, such as about 5-8 cm, in order to both position and load the roll shell into nipping engagement with its mating roll. As the end seal moves from a relatively lower position against the end plate to a relatively higher position, the end plate tends to move slightly in its mounting in the end dam due to the space between the plate and end dam which is filled with pressurized hydraulic fluid to effect the sealing engagement between the end plate and end seal. In other words, when the end seal is near the bottom of the end plate, the hydraulic pressure near the top of the end plate tends to move the top of the end plate toward the piston. When the end seal is near the top of the end plate, the hydraulic pressure tends to move the lower part of the end plate toward the piston. Such relative movement between the end seal and the end plate tends to gall the end plate and otherwise cause excessive wear and scuffing to the end plate. Such excessive wear is exacerbated at the top of the end plates due to their being constrained at the top by the end dam lip which prevents the end plate from coming out of its mounting in the end dam. The more restrained the end plates are near the tops of the end dams, the more unrestrained they are near the bottoms of the end dams, so that retraction of the piston in the channel is either restrained, or causes excessive wear against the lower portions of the end plates, or both.

Such a construction results in either the end dam being relatively tall, with a correspondingly tall end plate, or the translational piston movement relative to the support shaft to be limited, or both conditions are present. Neither of these physical or operating conditions permits the controlled deflection roll to operate under a desirably wide range of operating parameters.

Another problem associated with the prior design of end dam and seal arrangement is that in zone-control types of controlled deflection rolls, wherein successive, end-abutting, longitudinally aligned shoe segments are disposed along the longitudinal length of the controlled deflection roll support shaft in order to provide different roll shell support forces at different locations longitudinally along the length of the controlled deflection roll, the end dam and seal arrangement between such end-abutting shoe segments have to be quite wide, such as about 9-10 cm, in order to provide back-to-back end plates in the sealing arrangement. This reduces and limits the area in which the shoes can support the roll shell relative to the support shaft and also reduces the flexibility of the zone control since the shoe segments must necessarily be spaced further apart in the longitudinal direction along the length of the roll.

In a similar manner, the relative thickness of the end dams at the ends of the support shaft in prior sealing arrangements prevents the shoe from extending closer to the ends of the roll shell, and the floating nature of the end plate in the end dams results in the inability of the piston to accommodate a gap between itself and the end dam. The existence of such a gap is desirable, and often necessary, in order to accommodate relative deflection of the support shaft and shoe relative to the roll shell.

SUMMARY OF THE INVENTION

The short-comings and problems associated with the construction and operation of prior piston sealing arrangements described above have been obviated by this invention. In this invention, the side seals are also located in longitudinally extending slots. The side seals extend longitudinally to a point near the ends of the piston. End slots extend inwardly from the ends of the piston. The end seals are mounted in the end slots for translational movement outwardly relative to the ends of the piston. Each of the end seals has an upper and lower notched pair of surfaces which are aligned with a corresponding side slot so as to accommodate the ends of the side seals in a manner similar to the support of the side seals in the side slots.

One or more springs are mounted in holes bored in the bottoms of the end slots in the piston and are arrayed to engage the back surfaces of the end seals to bias the end seals outwardly relative to the piston.

Similarly, one or more holes are drilled in the lower surface of the piston to provide a passage between the lower surface of the piston and the lower surface of the end slots at either end of the piston. These holes thus provide a passageway for hydraulic fluid, which actuates the piston in its support and/or movement of the roll shell, to also provide hydraulic pressure to actuate the end seals outwardly relative to the piston and against a non-movable surface of an end dam which is mounted on the support shaft near either end of the shoe.

In this manner, the end seals can move outwardly relative to the piston and the side seals in a direction parallel with the longitudinal length of the piston while their notched surfaces remained slidably engaged with the side seals at or near either end of the piston. In this manner, the seal around the periphery of the piston is maintained between the lower surface of the piston, which is in contact with the pressurized hydraulic fluid, and the upper surface of the piston, which either engages the shoe supporting the roll shell, or is integral with the shoe supporting the roll shell.

The side and end seals of the piston travel with the piston and the side seals engage the side walls of a channel in the support shaft in which the piston is reciprocally mounted, and the end seals engage a non-movable wall on the end dams. Since the non-movable wall does not have to be hydraulically actuated against the end seals, the end dams can be of a simple, one-piece construction. As such, they can be relatively thin in their dimension which extends in the longitudinal direction of the support shaft. Thus, where the prior end dams might typically be about 11–12 cm thick, the end dams of this invention can be about 3–3.5 cm thick. Similarly, in an end dam abutting configuration for a zone-control type of controlled deflection roll, the end dams in this invention can be about half as thick as the end dams in the prior art types of sealing arrangements.

Accordingly, an object of this invention is to provide an improved sealing arrangement for the piston providing the roll shell support and nip loading force in a controlled deflection roll.

Another object of this invention is to provide a seal arrangement for a controlled deflection roll shoe wherein the seal apparatus comprises end seals which can move relative to the side seals on the piston.

Another object of this invention is to provide a sealing arrangement for a piston in a controlled deflection roll wherein the wear on the seals at the ends of the piston is minimized.

A feature and advantage of this invention is the provision of a sealing arrangement which does not require or utilize an end dam having a hydraulically actuated, floating end plate.

Another object, feature and advantage of this invention is to provide a seal arrangement for the piston in a controlled deflection roll which can accommodate relatively long distances of travel of the piston to actuate and move the roll shell, as well as to accommodate deflection of the support shaft relative to the roll shell in a controlled deflection roll.

These, and other objects, features and advantages of this invention will become readily apparent to those skilled in the art upon reading the description of the preferred embodiment in conjunction with the attached drawings.

DESCRIPTION OF THE PREFERRED EMBODIMENT

Figure 2:
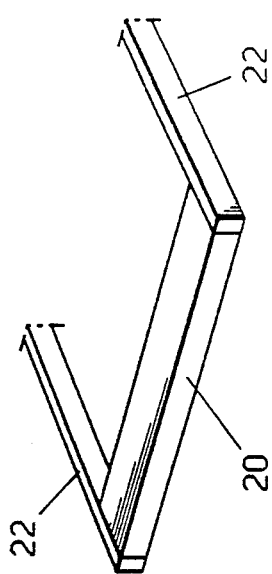
FIG. 2 is a perspective view of one end of the prior art type of seal which has an end seal extending between, and fitted to, corresponding side seals.
Figure 3:
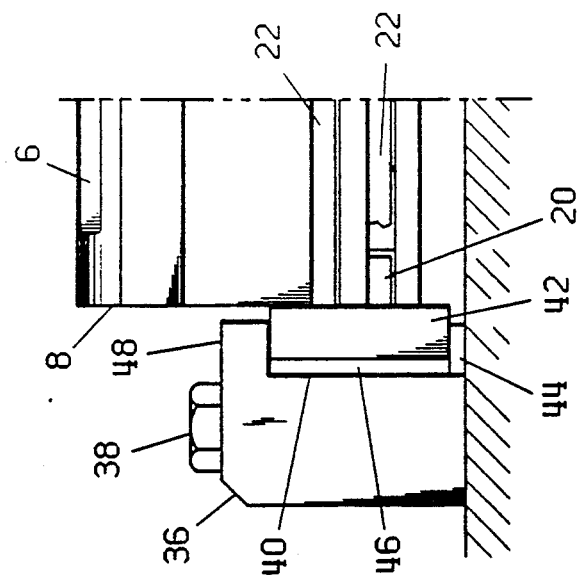
FIG. 3 is a side-elevational view of a prior art type of seal arrangement where the end seal shown in FIG. 2 is abutted against a floating end plate, which is mounted in, and actuated relative to, an end dam, which is mounted onto the support shaft in a controlled deflection roll.
Figure 1:
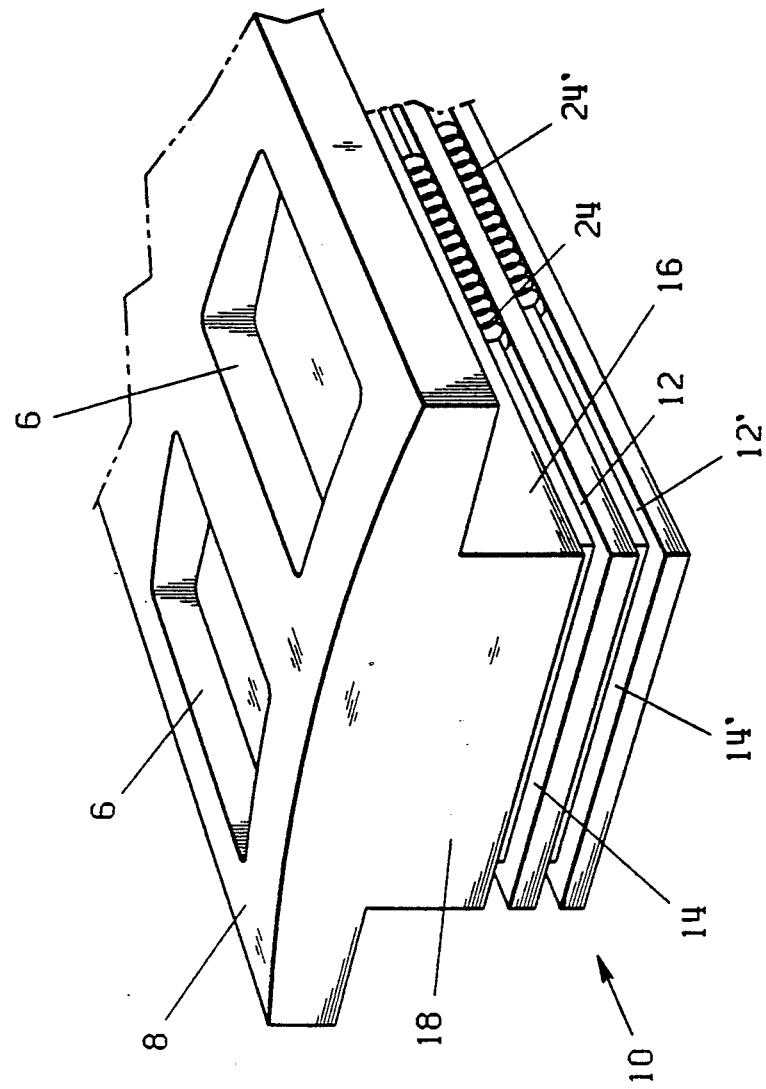
FIG. 1 is a perspective view of a piston having a shoe as an integral part of the piston and showing the prior art type of slots in the sides and ends of the piston in which the seals are mounted.

With reference to FIGS. 1, 2 and 3, in the prior art piston seal arrangement, the piston 10 has a pair of spaced side and end slots 12,14, respectively, which extend circumferentially about the piston. Both the side slots 12,12' and end slots 14,14' extend inwardly in the side and end walls 16,18, respectively, of the piston.

In all of the Figures, only one end or side of the particular piston, seal or slot is shown with the understanding that the other end or side is identical and need not be shown or described.

Figure 7:
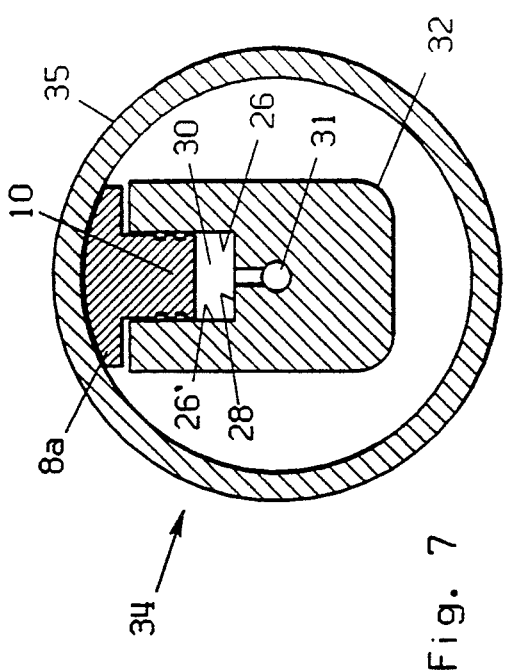
FIG. 7 is an end-elevational view, in cross-section, of a controlled deflection roll showing the support shaft, channel for the piston and roll shell.

As shown in FIG. 2, the prior art seals comprise an end seal 20, which is matched, or slidably fitted, to a side seal 22 at either end of the end seal, such that the outer periphery of the seal is continuous. Interposed between the side seals and the bottoms of the slots in the side walls of the piston are springs 24,24' which bias the side seals outwardly relative to the piston to engage side walls 26,26', which, together with a bottom wall 28, form a channel 30 in the support shaft 32 of a controlled deflection roll 34, as shown in FIG. 7. The channel 30 is the cavity formed between opposed side walls 26,26' in the support shaft 32 of the controlled deflection roll.

As shown in FIG. 3, the ends of the channel are defined by an end dam 36 at either end of the channel which is secured to the support shaft by a bolt 38. A notch 40 is formed in the end of each end dam facing toward the interior of the channel. An end plate 42 is disposed within the notch in the end dam, and an opening 44 is formed in the bottom of each end dam to admit hydraulic fluid beneath the end plate and in a space 46 between the end plate and the end dam for providing pressurized hydraulic force to the end plate relative to the end dam to urge the end plate against the end seals. A lip portion 48 at the top of each end dam prevents the end plate from moving out of the notch in the end dam.

Referring to the FIG. 7 end view, in section, of a controlled deflection roll 34 showing the roll shell 35, which roll 34 is generic to both the prior art construction of the roll shell 35, shoe 8a, piston 10 and support shaft 32, of both the prior art and of this invention, the side walls 26,26' which define the channel 30 in the support shaft are shown more clearly.

Figure 4:
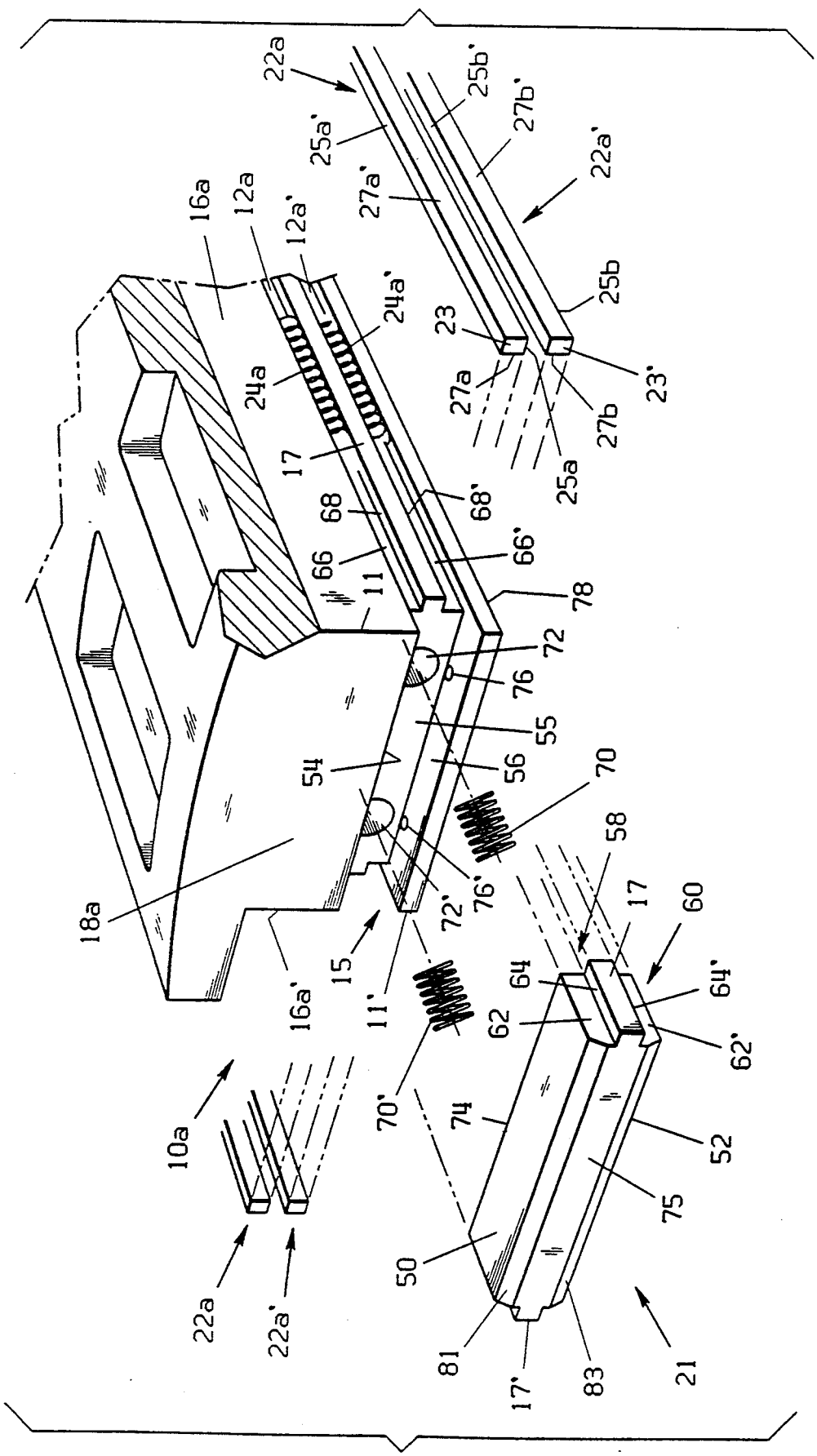
FIG. 4 is a perspective view of the end of a piston in this invention and showing the side slots, end slot and the end seal which is extended in exploded view format from the end slot.
Figure 6:
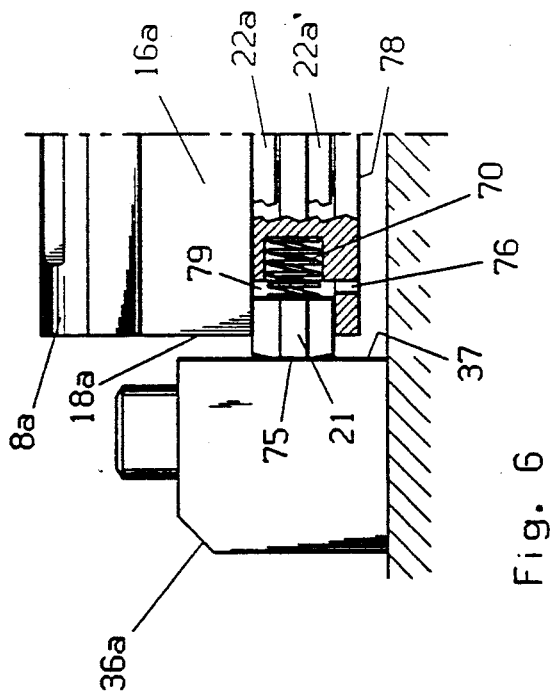
FIG. 6 is a side-elevational view of the piston and seal arrangement shown in FIG. 4, and showing the one-piece end dam used in conjunction with this seal arrangement.
Figure 5:
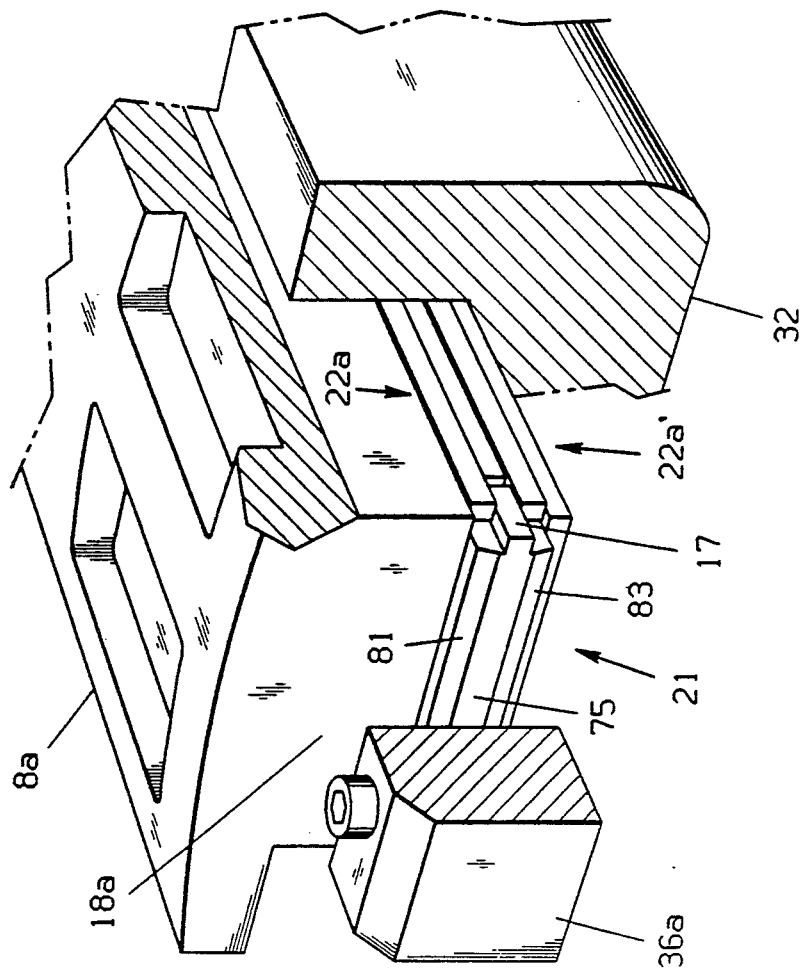
FIG. 5 is a perspective view of the piston of this invention showing the side seals and an end seal in operating positions.

In this description, elements in the invention shown in FIGS. 4-6 which correspond to similar elements in the prior art shown in FIGS. 1-3 will be correspondingly numbered with alphabetical suffixes to distinguish between them. It is recognized, of course, that while some elements, such as the side seals, might be similar, their relationship with other elements, such as the end seals, is different in both concept and structure in this invention than in the prior art arrangement.

With reference to the invention shown in FIGS. 4, 5 and 6, piston 10a has a pair of side slots 12a,12a' formed in its side walls 16a,16a'. These side slots are spaced apart and extend parallel in the longitudinal direction of the piston. An end slot 15 is formed in either end of the piston at a location which is over the ends of the side slots on either side of the piston. The end slot, thus, truncates the side wall slots, and a wall portion 17 between the slots 12a,12a', a short distance from the ends of the piston. Disposed within each side wall slot 12a,12a' is a spring 24a,24a' which is located beneath each of the corresponding side seals 22a,22a' which are sized and adapted to slidably seat in the side slots over the springs.

A substantially prism-shaped end seal 21 has upper and lower parallel surfaces 50,52 adapted to slidingly engage corresponding upper and lower surfaces 54,56 in the end slots 15 so as to be slidably mounted in the end slots. At each end of each end seal is a pair of notches 58,60 having vertical and horizontal sealing walls or surfaces 62,64 and 62',64', respectively, so dimensioned as to align with the vertical and horizontal surfaces 66,68 and 66',68' of the slots 12a,12a' in the side walls of the piston. The notches 58,60 and the slots 12a,12a', therefore, are aligned end- to-end and are extensions of one another when the end seal is in operating position in either end of the piston. A pair of springs 70,70' are mounted in corresponding bores 72,72' in the piston so as to provide an outwardly biased force against the back wall 74 of each end seal to maintain the end seals biased outwardly relative to the piston.

Also with reference to FIG. 4, a pair of holes 76,76' are located in the lower surface 78 of the piston and extend upwardly through the lower surface 56 of the end slots.

With reference to FIG. 5, when the side seals and end seals are mounted in their respective slots, the distal ends 23,23' of the side seals do not extend beyond the end edges 11,11' of the piston. However, due to the biasing pressure of springs 24a,24a', the side seals 22a,22a' may extend outwardly from the piston slightly beyond the side 16a of the piston and either wall portion end 17,17' of the end seal. Similarly, the front wall 75 of the end seal is biased outwardly from the end wall 18 of the piston by springs 70,70'.

With reference to FIG. 6, end dam 36a has a integral, non-movable seal surface 37 which engages the front wall surface 75 of the end seal 21. The seal front wall surface 75 is vertically arrayed relative to the support shaft such that it extends parallel to the intended direction of translational movement of the piston within the channel in the support shaft of the controlled deflection roll. The end surface 18a of the piston above the end slot is under cut so as to accommodate slight amounts of movement of the end dam on the support shaft relative to the piston. The upper and lower portions 81,83 of the front wall surface 75 are beveled to enhance lubrication.

In operation, the springs 24a,24a' bias the side seals 22a,22a' outwardly against the side walls of the channel 30 in the support shaft 32, and springs 70,70' bias the end seals outwardly against the seal surface 37 on the end dam 36a. Only one of the end dams is shown in FIG. 6 with the understanding that an identical end dam is mounted to the support shaft on the other end of the roll. Pressurized hydraulic fluid is introduced into the channel 30 beneath the piston through a conduit 31 which receives pressurized hydraulic fluid from a source, such as a pump (not shown), outside of the controlled deflection roll. The manner in which pressurized hydraulic fluid, which is used to both actuate the piston and to lubricate the interface of a shoe, such as shoe 8a shown in FIG. 7, by introducing pressurized hydraulic fluid into the pockets 6 in the face of the shoe (FIG. 1), is well-known in the art and does not per se form part of the invention, so it will not be discussed in further detail.

The pressurized hydraulic fluid also travels from beneath the lower surface 78 of the piston through openings 76,76' to a space 79 between the back surface 74 of the end seal and the back surface 55 of the end slot 15. This pressurized hydraulic fluid, thus, biases the end seals outwardly and against the seal surfaces 37 of the end dams to effect a liquid seal between the end seals and the seal surfaces. The springs 24a,24a' mounted in the slots 12a, 12a' intermediate the side seals and the piston maintain the side seals in fluid sealing engagement with the side walls 26,26' of the channel.

The side seals 22a,22a' each have two parallel, horizontal upper and lower surfaces 25a,25a'; 25b,25b', respectively. The side seals also have two parallel, vertical inner and outer surfaces 27a,27a'; 27b,27b', respectively. There vertical surfaces are relative to the inner surfaces 66,66' of the side slots.

The end seal is slidably mounted in the end slot such that it's vertical notch walls 62,62' slidably engage corresponding vertical seal walls 27a,27b, and its horizontal notch walls 64,64' slidably engage corresponding horizontal seal walls 25a,25b', respectively.

The side seal springs 24a,24a' and the end seal springs 70,70' maintain the side seals and end seals biased outwardly from the corresponding walls of the piston such that the outer faces of the side and end seals bear against the side walls of the channel (side seals) and the non-movable walls of the end dams at either end of the channel. In addition, pressurized hydraulic fluid used to load the piston radially outwardly relative to the support shaft travels through the holes 76,76' from the lower surface of the piston to the lower surface of the end seal slot to hydraulically actuate the end seals outwardly from the ends of the piston and against the non-movable end dam surfaces 37 which extend parallel with the direction of piston actuating movement reciprocally in the channel of the support shaft. The end seals are thus maintained under the same hydraulic fluid pressure at all positions of the piston in the channel, regardless of whether the piston is retracted, in an intermediate position, or fully extended relative to the support shaft. The end seals are hydraulically loaded perpendicular to the non-movable surface of the end dams at all positions of the piston, and this results in greatly reduced wear of the end seals against the end dam, and particularly mitigates against galling of the end dam non-movable sealing surface 37.

Since movement of the end seals outwardly relative to the end surfaces of the piston is accommodated while the side seals maintain their vertical inner surfaces, and opposed lower and upper horizontal surfaces in sliding engagement with corresponding surfaces in the notches at either end of the end seals, regardless of the relative position of the end seal and the end surface of the piston, a hydraulic seal is maintained between the pressurized hydraulic fluid acting against the lower surface 78 of the piston and the portion of the piston above the side and end seals. In other words, with reference to FIG. 5, even though hydraulic fluid might, somehow, be introduced into a space between the end of the wall portion 17 between the side seals and the back wall surface 74 of the end seal, the overlap of the side seals extending into the notches of the respective ends of the end seal, and bearing against the corresponding vertical and horizontal surfaces of the notches, as explained previously, prevents access of the pressurized hydraulic fluid to the area between the piston and the channel and end dams above the side and end seals.

Therefore, while the edges 11,11' of the piston can be, and are, slightly spaced from the channel walls, including the end dam, the outer sealing surfaces 27a',27b' of the side seals operating in conjunction with the outer sealing surfaces 75 on each of the opposed end seals prevents the passage of pressurized hydraulic fluid to a position against the piston above these side and end seals.

To recapitulate, the end seals, by virtue of their notches mating with the side seals with their corresponding vertical and horizontal surfaces being in sliding engagement with one another as explained above, a seal is maintained despite such relative movement. The side and end slots prevent movement of the side and end seals in any direction other than longitudinally along the length of the respective slots.

Accordingly, a piston seal arrangement has been disclosed, described and shown which meets the objectives and includes the features and advantages set forth.

Naturally, various modifications can be made in the structure without departing from the spirit and scope of the invention. In this regard, while the various mating surfaces of the side and end seals which slide relative to one another have been described as being substantially horizontal and vertical, the important relationship is that the corresponding surfaces on the side seals and the notch surfaces engage in sliding and sealing contact, preferably face-to-face, regardless of the position of the surfaces relative to the end seal.

The material for the seal is preferably steel, but other materials which can withstand the operating temperatures and provide the desired sealing contact are contemplated and could be used.

Finally, while the detailed description has been made in the context of a piston seal arrangement in a controlled deflection roll, the scope of the invention is intended to include such a piston seal arrangement in conjunction with an extended nip press, the apparatus of which is well-known to the papermaking industry artisan. Thus, the channel in which the piston is mounted would be in a beam disposed in an extended nip press apparatus, and the piston shoe would bias the looped blanket in the extended nip press.

What is claimed is:

1. Piston sealing apparatus for use in a controlled deflection roll or an extended nip press apparatus, said apparatus including a support shaft with a channel having a pair of spaced, longitudinally extending side walls, the apparatus comprising:

a piston having upper and lower surfaces, a pair of spaced, longitudinally extending side walls, and a pair of spaced end walls extending transversely between the side walls;

side slot means extending longitudinally in each of the side walls;

end slot means extending across each of the end walls and having an interior wall intersecting with the side slot means longitudinally inwardly of the piston end walls where the end walls and side walls intersect;

end dams mounted to the support shaft at either end of the channel, each end dam including a non-movable seal surface facing the channel;

side seal means having at least two surfaces and disposed within the side slot means and extending longitudinally to a point at least near the intersection of the piston side and end walls, and extending outwardly of the side slot means for engagement with the channel side walls;

end seal means slidably disposed within the end slot means at either end of the piston and including at least one notch surface at either end thereof cooperating with at least one surface of the side seal means to sealingly engage the side seal means and to provide, with the side seal means and end dam seal surfaces, a continuous seal extending peripherally about the piston;

biasing means operatively associated with the end seal means at either end of the piston for urging the end seal means outwardly relative to the piston and against the non-movable end dam seal surface;

hydraulic means for establishing fluid communication between the end seal means and a source of pressurized hydraulic fluid whereby the end seal means at either end of the piston can be biased outwardly from the piston and against the non-movable end dam seal surfaces.

2. Piston sealing apparatus as set forth in claim 1, wherein:

the side seal means extend longitudinally beyond the interior wall of the end slot means and slidably engage the end seal means longitudinally beyond the interior wall of the end slot means.

3. Piston sealing apparatus as set forth in claim 2, wherein:

the side seal means includes two side seals which slidably engage corresponding surfaces of the notch to provide a continuous seal therebetween.

4. Piston sealing apparatus as set forth in claim 1, wherein:

the end seal means includes a notch at either end thereof, said notch including two seal surfaces for slidably receiving the side seal means to provide a continuous seal.

5. Piston sealing apparatus as set forth in claim 4, wherein:

the notch at either end of the end seal means comprises a pair of intersecting seal surfaces at either end of the end seal means;

the side seal means comprise a pair of parallel, longitudinally extending side seals, spaced apart and longitudinally extending beyond the interior wall of the end slot means to slidably engage with corresponding ones of the pair of seal surfaces in the notches to provide a continuous seal peripherally about the piston.

6. Piston sealing apparatus as set forth in claim 1, wherein:

the hydraulic means includes at least one bore extending from the lower surface of the piston to the end slot means to provide fluid communication therebetween.

7. Piston sealing apparatus as set forth in claim 1, wherein:

the side seal means includes at least a pair of intersecting seal surfaces;

the end seal means includes a notch at either end thereof, said notch including at least one pair of intersecting seal surfaces, each of the notch seal surfaces aligned with corresponding seal surfaces of the side seal means on either side of the piston to provide a continuous seal peripherally about the piston.

8. Piston sealing apparatus as set forth in claim 1, further including:

spring means disposed within the side slot means for biasing the side seal means outwardly from the side walls for engagement with the channel side walls.

9. Piston sealing apparatus as set forth in claim 1, wherein:

the biasing means associated with the end seal means comprises at least one spring mounted between each end seal and the piston.

* * * * *